United States Patent [19]
Gordon

[11] 3,733,985
[45] May 22, 1973

[54] CAMERA FILM IMAGING DEVICE

[76] Inventor: Lester Gordon, 10 Louise Street, Lewiston, Maine 04240

[22] Filed: Dec. 17, 1971

[21] Appl. No.: 209,038

[52] U.S. Cl. ............................................. 95/1.1
[51] Int. Cl. ...................................... G03b 17/24
[58] Field of Search ............................... 95/1.1

[56] References Cited

UNITED STATES PATENTS

| | | |
|---|---|---|
| 813,808 | 2/1906 | Loryea .................................. 95/1.1 |
| 2,226,364 | 12/1940 | Anthony ................................ 95/1.1 |

*Primary Examiner*—John M. Horan
*Attorney*—Frederick L. Bergert

[57] ABSTRACT

Apparatus for printing an image upon a film negative in a camera is disclosed. The apparatus includes a series of tapes which carry figures to be recorded on the film by a portion of the light which enters the camera through the lens at the time a picture is taken and passes through the tapes to impinge upon the film. Either the tapes or the figures carried by the tapes can be transparent. The tapes are superimposed one upon the other in proximity to the film exposure area with spaces on the tapes to allow one or more figures carried by each of the tapes to be recorded simultaneously on the film.

8 Claims, 5 Drawing Figures

CAMERA FILM IMAGING DEVICE

BACKGROUND AND SUMMARY OF THE INVENTION

The present invention relates to photographic apparatus. More particularly, the present invention relates to apparatus to be installed in connection with a camera to provide a means of recording on the film the date on which the photograph was taken or other information.

In the taking of pictures with photographic cameras, it is often desirable to record on the film the date on which the picture was taken or a title or caption for the photograph in order to remind the photographer of the setting or circumstances in which the picture was taken. Previous apparatus for the recording of information on the film negative within a camera has included, for example, a second chamber located within the camera with a second aperture to admit light and thus allow a group of numerals carried by a series of aligned ribbons to be exposed upon the film threaded across the back of the camera. Other prior art apparatus has included separate tape systems for each item of information, such as the month or the year, to be printed upon the film with the tape systems located within the film exposure area.

By the present invention, there is provided photographic apparatus for recording the date or other useful information upon the film negative in a camera. The apparatus of the present invention employs a portion of the light which passes into the camera through the lens at the time a picture is taken to record an image on the camera film. The present apparatus includes a series of continuous tapes each of which contains a group of items of information such as a listing of the months, days or years. With regard to each tape, one or the other of the tape or the figures thereon is transparent while the other is opaque to the passage of light. The tapes are wound on a plurality of disks which are mounted for independent rotation upon the exterior of the camera and which, together with a set of guide members, provide a means of positioning the tapes within the camera in proximity to the film negative located at the back of the camera. A portion of the light entering the camera through the lens passes through the tapes and transfers images which appear on the tapes to the film negative. The tapes are superimposed one upon the other in proximity to the film in the film exposure area and spaces are provided on the tapes to allow information contained on all tapes to be projected simultaneously onto the negative. Processing of the film negative by conventional methods results in a permanent record on the finished photograph of the selected information carried on the tapes. The apparatus may be easily operated by a series of levers located on the exterior of the camera. Referring to the drawings:

DESCRIPTION OF THE PREFERRED EMBODIMENTS

Figure 1:
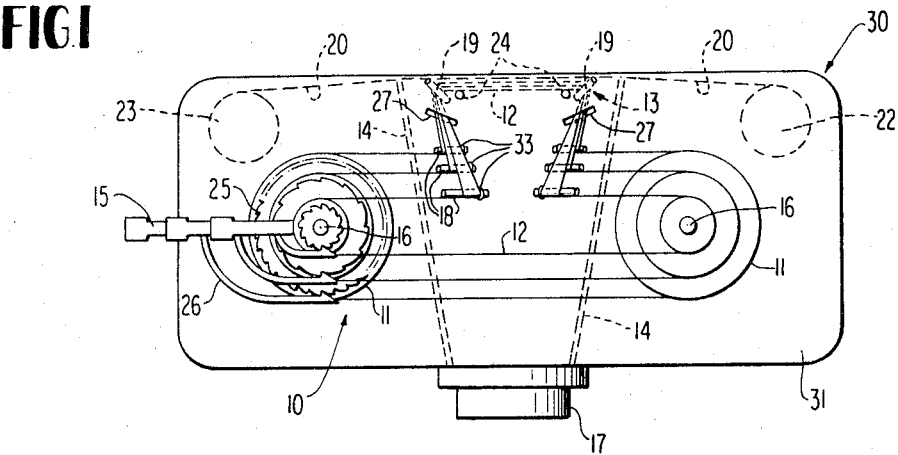
FIG. 1 is a bottom elevational view of apparatus constructed according to the principles of the present invention, showing the continuous tapes and rotatable disks in position on the bottom of the camera.
Figure 2:
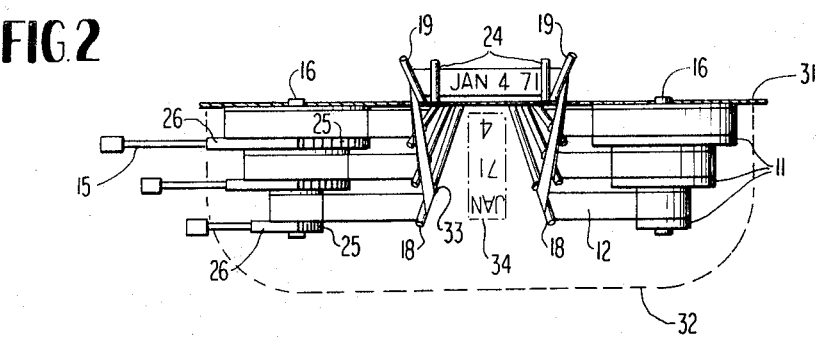
FIG. 2 is a partial side elevational view of the apparatus of FIG. 1 with the addition of a cover extending below the camera to protect the apparatus of the invention.
Figure 3:
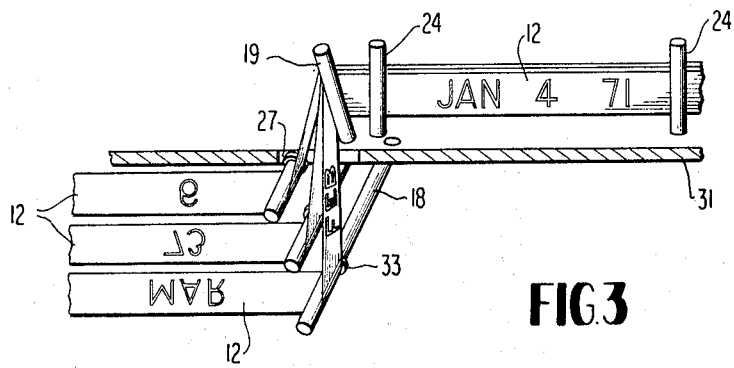
FIG. 3 is a cross-sectional view of the apparatus of FIG. 1 showing the tapes containing the figures to be projected onto the film.

In the illustrated embodiment of the present invention as shown in FIGS. 1 through 3, apparatus 10 is provided for recording information on photographs taken with a camera 30. The camera 30 shown is a conventional snap-shot camera having a spool 22 for supplying film 20 to the film exposure area 13 and a take-up spool 23 at the opposite end of the camera 30. Conventional partitions 14 are provided to close off the picture-taking area within the camera 30. The picture-taking area is defined at the forward portion of the camera 30 by a lens 17 and at the rear portion by the film negative 20 which abuts the back of the camera 30 in a position for exposure as light enters through the lens 17 when a picture is taken.

The apparatus 10 of the invention as depicted in the drawing is for the purpose of printing the date on the camera film 20 and includes two sets of concentric disks 11 mounted on the exterior of the camera 30 with three independently rotatable disks 11 in each set. The disks 11 are situated in proximity to the film exposure area 13 with one set of disks 11 being positioned on either side of and exterior to the exposure area 13. A series of three endless transparent tapes 12 are wound upon the concentric disks 11 with each of three tapes 12 being wound onto a disk 11 in one of the sets of concentric disks and the corresponding disk 11 in the other set of concentric disks. The concentric disks 11 are formed of any durable material suitable for providing a base upon which the tapes 12 may be wound and may, for example, be of metal construction with a rubber facing to hold the tapes securely and prevent them from slipping as the tapes 12 are wound on the disks 11. The disks 11 are secured to the base 31 of the camera 30 by suitable means such as steel pins 16 inserted through the base 31. The tapes 12 may be of any lightweight, transparent material which is easily wound on the disks 11 and which is suitable for carrying the opaque numbers or other figures to be recorded on the camera film 20. Examples of such a material would be a transparent, celluloid-type material similar to that employed in the film negative or a plastic film material such as, for example, that sold under the trademark Mylar. It may be desirable to employ an opaque tape, rather than one which is transparent, and, in this case, the figures to be recorded should be transparent in order to allow the image of the figures to be projected upon the film 20.

From the concentric disks 11 the tapes 12 are threaded around turn guides 18 as shown in FIGS. 1 and 2. The tapes 12 then pass through the cover of the camera 30 into the camera interior where the tapes 12 are then threaded around main guides 19. In the embodiment of the present invention, as shown in FIGS. 1 and 2, a single main guide 19 is provided on either side of the film exposure area 13. Alternatively, a separate main guide 19 may be employed on either side of the film exposure area 13 for each of the tapes 12. At the junction of the tapes 12 with the main guides 19 on either side of the film exposure area 13 the tapes 12 become superimposed one upon the other and pass into the film exposure area 13 in proximity to and along the lower edge of the film negative 20. The part 27 of the camera cover which is adjacent to the tapes 12 as the tapes 12 pass through the cover may be lined with a suitable material in order to maintain the lighttight characteristics of the cover. The turn guides 18 are preferably positioned so that the tapes 12 are twisted in a one-half twist with respect to their longitudinal axes as the tapes 12 pass between the turn guides 18 and the main guides 19. Such a twist may be imparted by having the turn guides 18 positioned so as to lean toward the concentric disks 11 on the exterior of the camera 30 and the main guides positioned so as to lean outwardly from the film exposure area 13 as shown in FIG. 2. This twisting action facilitates the smooth indexing of the separate tapes 12 into proper position in proximity to the film negative 20 to be exposed. Both the turn guides 18 and main guides 19 may be in the form of metal or plastic pins and both sets of guides are secured at their lower portions to the base 31 of the camera 30. Notches or projections 33 may be formed into the guides 18 and 19 to prevent slippage of the tapes 12 relative to the guides and also to aid in the alignment of the tapes 12 around the guides as well as to assist in the placement of the tapes in their superimposed position between the main guides 18 in proximity to the film 20.

Between the main guides 18 where the tapes 12 are in proximity to the film 20, the tapes should extend along the lower edge of that part of the film to be exposed and should preferably be positioned as close to the film as possible in order to insure legibility and prevent distortion in transferring the date onto the film 20. Additional guides 24 may be provided in the film exposure area to maintain the superimposed tapes 12 in proximity to the film negative 20. Due to the inversion of the negative, the information contained on the tapes 12 will appear at the top of the developed photograph. If desired the tapes 12 may be positioned at the upper portion of the film exposure area 13 so that the figures on the tapes will be recorded at the bottom of the film 20. Also the apparatus 10 may be installed entirely within the camera 30 with the concentric disks 11 mounted on the inner bottom of the camera 30, for example, and control means extending through the cover of the camera 30 to the exterior for control by the camera operator. The width of the concentric disks and the length of the guides will depend generally upon the width of the tapes 12 employed. The concentric disk 11 having the largest diameter will ordinarily be employed to carry the tape 12 having imprinted thereon the days of the month, due to the greater number of individual numerals to be imprinted and the corresponding requirement for a relatively longer tape.

As previously mentioned, the tapes 12 are superimposed one upon the other within the body of the camera 30 in the area between the main guides 19 where the tapes 12 are in proximity to the camera film 20. In order to allow the desired figures on each tape 12 to be projected upon the film 20 by a portion of the light which enters the camera when the shutter is opened to take a picture, spaces are provided between the separate figures on each tape 12 to allow the figures from the other tapes 12 to be projected onto the film 20. Thus, for example, in the case of the tape 12 containing the months of the year, there should be sufficient space allowed on the tape between the individual months so that the day of the month and also the year may be registered into position for recording on the film 20 when the film is exposed. The tape containing the days of the month should have the numbers representing the various days of the month spaced sufficiently to allow the name of an individual month to be projected through onto the film negative 20 from the superimposed tape 12 containing the list of months. By allowing such a space between the numbers representing the various days of the month, this will provide sufficient space to allow a number representing the year also to be projected through from the superimposed tape 12 containing the list of years as shown in FIGS. 2 and 3. As to the tape 12 on which appear numbers representing the various years, sufficient space should be allowed between each year for the month and also the day of the month to be projected through from the other superimposed tapes 12 onto the film negative 20. Thus there may be recorded on the film 20 a date which includes the month, the day of the month and the year. The order in which the various components of the date appear on the film 20 may, of course, be varied as desired, but any variation from the order described should take into account the spacing required on the various tapes 12 in order to allow information on all tapes 12 to be projected simultaneously onto the film negative 20.

The concentric disks may be controlled by any conventional apparatus which will allow the operator of the camera 30 to advance the tapes 12 to the desired positions. Such control apparatus may include, for example, a series of levers 15, as shown in FIG. 1, with a separate lever 15 attached to the center portion of each disk 11 in one of the sets of disks and employing means such as a rachet and pawl connection to advance the tapes 12. Such a connection may include a ratchet wheel 25 attached to the lower surface of each of the disks 11 in the concentric set. A lever 15 with an attached pawl 26 engages each ratchet wheel 25 so that the reciprocating motion by the lever 15 will rotate the ratchet wheel 25 which rotates the disk 11 to which it is attached, thus advancing the tape 12 which is wound on the disk 11.

Figure 4:
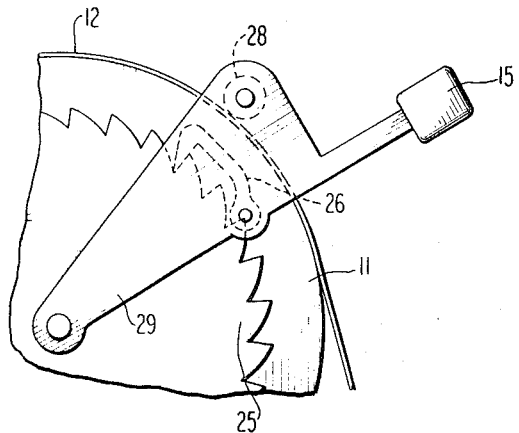
FIGS. 4 and 5 are partial bottom views of modifications of the subject apparatus.

In order to insure that the tapes 12 remain in synchronization as the disks 11 are rotated, a cylindical or drum member 28 may be employed to exert pressure against the tape 12 as a disk 11 is rotated. As shown in FIG. 4, the drum member 28 and the pawl 26 are both attached to a plate 29 which in turn is secured by welding or other suitable means to the lever 15. Reciprocating movement by the lever 15 rotates the ratchet wheel 25 while the drum member 28 exerts pressure on the tape 12 and biases it in the direction in which the tape 12 is to be advanced. The plate 29 and the drum member 28 may be of metal or similar durable material with the drum member 28 being covered with rubber or other suitable material which will allow the drum member 28 to adhere tightly to the tape 12.

As an additional means of insuring positive contact of the tapes 12 with the disks 11 and to prevent slippage of the tapes 12 as the disks 11 are rotated, the tapes 12 can be provided with notches along one edge similar to the notches used in movie film. Spurs can be provided on the periphery of the disks 11 to engage the notches in that portion of a tape 12 in contact with the disk 11. These notches would be located along the extreme bottom edge of the tapes 12 in order not to transfer an image of the notch onto the film.

In order to provide the camera operator with an indication of the particular date which is indexed in the film exposure area 13 for projection upon the film negative 20, a portion of each of the tapes 12 may be utilized for a set of figures which is a duplicate of those previously described, the duplicate figures being observable on the exterior of the camera 30. Such an arrangement would result in that portion of each tape 12 near the film exposure area 13 bearing figures for recording on the film 20 and the portion of each tape 12 near the front of the camera bearing figures for providing a visual indication to the camera operator. Thus, for example, as shown in FIG. 2, a cover 32 may be provided for the concentric disks 11 and tape 12 arrangement beneath the camera 30 with the cover being attached to the base 31 of the camera 30. A window 34 may be cut into the front side of the cover 32 similar to the windows employed in conventional snap-shot cameras to indicate the number of exposures which have been used on the roll of film. The front portion (not shown) of each of the tapes 12 would thus be visible to the camera operator. The duplicate figures to appear in the window should be correlated with the figures to be indexed in the film exposure area 13 so that by observing the figures which appear in the window, the operator may advance the tapes 12 to a position for recording the desired date on the film 20.

Figure 5:
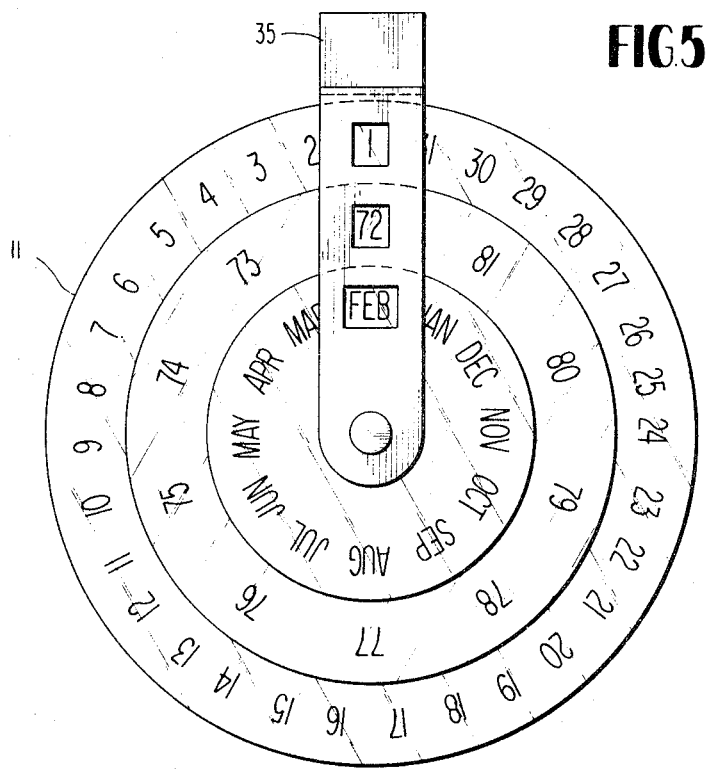

An alternative means of providing an indication to the camera operator of the date indexed for projection upon the film is shown in FIG. 5, in which the bottom of each disk 11 in one of the sets of disks is inscribed with the various numbers or letters of a component of the date. A stationary indicator 35 having windows through which the indexed date is visible is mounted on the set of disks in a position to be flush with the cover (not shown) for the apparatus. The diameter of the disks 11 may be varied as necessary in order to correlate the date which appears at the indicator 35 with the date which is indexed for projection upon the film. Also, magnification means may be employed as necessary in the windows of the indicator 35.

From the foregoing description, it is apparent that the subject apparatus may be employed to provide a record on film of various information such as the date, a caption or title or any other information which it is desired to record in connection with a particular photograph. The apparatus of the present invention particularly lends itself to use in a situation where it is desired to display a continuous legend on the film, as in the case of a date or a title consisting of several words. Additional concentric disks may be added as necessary depending on the number of figures which it is desired to imprint on the photograph. Although the present apparatus is shown employed in a simple snap-shot type camera, it may be employed in any camera where light is projected from the lens to the film as a picture is taken and thus, for example, the apparatus may be advantageously installed in 35 mm. cameras, in Polaroid-type cameras and also in movie cameras.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

It is claimed:

1. In a camera having an interior picture-taking area defined by a lens at the forward portion and a film negative located at the rear portion for exposure by light entering through the lens when a picture is taken, the combination comprising:
    a. a plurality of figure-bearing endless tapes movably secured to the camera on two sets of rotatable disks, the disks in each set being concentrically mounted on the exterior of the camera, one set of the disks being mounted on the base of the camera on each side of the picture-taking area with each tape being mounted on a separate disk in each set of disks, each of the tapes having the property that one or the other of the tape or the figures thereon is transparent while the other is opaque to the passage of light, and each tape having a portion thereof located in proximity to the film negative in a super-imposed condition with respect to the other tapes so that a portion of the light passing through the lens on its way to the film negative when a picture is taken will be intercepted by an opaque portion of each of the tapes, the figures on each tape having a spaced relationship with respect to each other with the spacing being of a size such that one or more figures on each of the tapes can be projected simultaneously onto the film negative by the light which enters the camera through the lens, and
    b. means for individually adjusting the tapes in order to position the desired figures appearing on the tapes in proximity to the film negative.

2. The apparatus of claim 1 wherein the tapes are twisted in a ½ twist with respect to their longitudinal axes on either side of the area in which the tapes are superimposed in proximity to the film negative.

3. The apparatus of claim 1 wherein each tape is wound around a pair of guides between each set of concentric disks and the picture-taking area, one of the guides in each pair of guides being located on the exterior of the camera and the other guide in each pair of guides being located on the interior of the camera, both guides in each pair being mounted on the base of the camera.

4. The apparatus of claim 3 wherein the means for individually adjusting the tapes includes a series of levers attached to one of the sets of concentric disks, a separate lever being provided for each disk in the set and each lever being in engagement with its respective disk by means of a ratchet and pawl combination.

5. The apparatus of claim 4 further including means connected to each lever to bias the respective tape in the direction in which the tape is to be advanced.

6. The apparatus of claim 4 further including indicating means to provide an indication to the camera operator of the figures on each tape which are indexed for projection onto the film negative.

7. The apparatus of claim 6 wherein the indicating means includes a second set of figures on each tape, said second set of figures being correlated with the figures to be projected upon the film negative so that when a figure in the second set of figures is visible to the camera operator, a corresponding figure is indexed for projection upon the film negative.

8. The apparatus of claim 6 wherein the indicating means includes a second set of figures on the outer surface of one of the sets of concentric disks, said second set of figures being correlated with the figures to be projected upon the film negative so that when a figure in the second set of figures is visible to the camera operator, a corresponding figure is indexed for projection upon the film negative.

* * * * *